3,285,861
CRYSTALLINE POLY(EPOXIDE)S
Edwin J. Vandenberg, Wilmington, Del., assignor to Hercules Incorporated, a corporation of Delaware
No Drawing. Filed Dec. 27, 1962, Ser. No. 247,544
4 Claims. (Cl. 260—2)

This application is a continuation-in-part of my application Serial No. 738,626, filed May 29, 1958, now abandoned, and of my application Serial No. 812,079, filed May 11, 1959, now U.S. 3,135,705, which is a continuation-in-part of my application Serial No. 738,626, filed May 29, 1958.

This invention relates to crystalline homopolymers of branched chain aliphatic epoxides.

It is well known that alkylene oxides such as ethylene oxide and propylene oxide can be polymerized to produce valuable polymers varying from sirupy liquids to waxy solids.

Now in accordance with this invention it has been discovered that epoxides which have the general formula

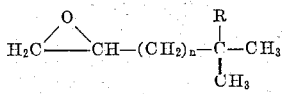

where $n$ is 0 or 1 and R is H or methyl when $n$ is 0 and is methyl when $n$ is 1, can be polymerized to yield crystalline polymers with unexpected, outstanding, and unique properties. Branched chain epoxides having this formula and which can be polymerized to crystalline stereoregular, i.e. isotactic, polymers are 1,2-epoxy-3-methylbutane; 1,2-epoxy-3,3-dimethylbutane; and 1,2-epoxy-4,4-dimethylpentane.

The crystalline homopolymer of 1,2-epoxy-3-methylbutane, which may also be called isopropyl ethylene oxide, is a highly crystalline polymer, as shown by its X-ray diffraction powder pattern, and has a melting point of 38–39° C. The low melting point of this isotactic polymer was most surprising. It was to be expected that this highly branched-chain olefin oxide polymer would have a melting point anywhere from 100 to 200 degrees higher than the corresponding linear olefin oxides such as poly(ethylene oxide) and poly(propylene oxide) since in the isotactic poly(olefin)s and isotactic poly(vinyl ether)s, the highly branched-chain polymers had much higher melting points than the lower linear chain polymers. In addition, it is a somewhat slow polymer to recrystallize in contrast to isotactic polypropylene and poly(vinyl methyl ether) which readily recrystallize. The homopolymer of 1,2-epoxy-3-methylbutane is a very tough, rubbery polymer which can be oriented by drawing at room temperature, and shows the typical necking down behavior for a crystalline polymer. The oriented film was very strong, but still quite rubbery. Thus, it is a unique elastomer having the ability to crystallize on stretching which can then be used as such or vulcanized. These properties make it useful as a natural rubber substitute and as an adhesive component, particularly delayed tack adhesives where it can be used in crystalline form and then converted at the desired time by heat to the rubbery, tacky form.

The crystalline polymer of tert.-butyl ethylene oxide, i.e. 1,2-epoxy-3,3-dimethylbutane, was also highly crystalline as shown by its X-ray diffraction powder pattern and had a melting point of from about 132° C. to about 166° C. In this case it was surprising to find that the monomer could be polymerized at all since the analogous olefin, tert.-butyl ethylene does not polymerize. Like the poly(isopropyl ethylene oxide), the melting point is unexpectedly low, as it would have been anticipated that, if polymerizable, the polymer would be too high melting to fabricate easily. However, the crystalline poly(tert.-butyl ethylene oxide) is very readily extruded to give films, fibers, etc., which can be oriented.

The crystalline homopolymer of neopentyl ethylene oxide, i.e. 1,2-epoxy-4,4-dimethylpentane, also is much lower melting, having a melting point of about 75° C. to about 82° C., than was to be expected based on the melting points of the analogous poly(olefin)s and poly(vinyl ether)s. Unlike the latter polymers which readily crystallize, this isotactic poly(neopentyl ethylene oxide) does not crystallize readily from the melt. It is a rubbery polymer which exhibits the unusual phenomenon of crystallizing poorly above its glass transition temperature. This behavior makes this a unique material for use in delayed tack adhesives, i.e. used in crystalline form, alone or with various additives such as rosin derivatives, waxes, etc.; it can, by raising the temperature, be converted to a permanent, tacky, adhesive form.

The new crystallizable, isotactic, polymeric epoxides of this invention can be prepared by contacting the monomer with, as catalyst, an aluminum alkyl that has been reacted with a chelating agent and with water within specified molar ranges. Thus, any trialkylaluminum or alkylaluminum hydride that has been reacted with from about 0.1 to about 1.5 moles of a chelating agent such as acetylacetone, trifluoroacetylacetone, etc., and also reacted with from about 0.1 to about 1.5 moles of water and preferably 0.5 to 1 mole of water per mole of alkylaluminum compound may be used. Exemplary of the alkylaluminum compounds that may be so reacted with a chelating agent and water and used as the catalyst are triethylaluminum, tripropylaluminum, triisobutylaluminum, trioctylaluminum, diethylaluminum hydride, diisobutylaluminum hydride, etc.

The polymerization reaction is generally carried out in the presence of an inert, liquid, organic diluent but may be carried out in an essentially bulk polymerization process. Suitable diluents that may be used for the polymerization are the ethers such as diethyl ether, dipropyl ether, dibutyl ether, etc., halogenated hydrocarbons such as chlorobenzene, methylene chloride, etc., or preferably a hydrocarbon diluent such as propane, butane, pentanes, n-heptane, cyclohexane, benzene, toluene, etc., and mixtures of such diluents. The temperature of the polymerization process may be varied over a wide range generally from about −80° C. to about 250° C. and preferably from about −30° C. to about 150° C. and while atmospheric or autogenous pressure is usually used, the pressure may be varied from subatmospheric up to several atmospheres, if desired.

The following examples illustrate the preparation of the new crystallizable polymers of this invention. All parts and percentages are by weight unless otherwise indicated. By the term "RSV" is meant the reduced specific viscosity of the polymer as determined on a 0.1% solution of the polymer in tetrachloroethane at 100° C. unless otherwise indicated. The melting points given are those determined as the temperature at which the birefringence due to crystallinity disappears, denoted as birefringence method, or those determined by differential thermal analysis.

*Example 1*

Five (5) parts of isopropyl ethylene oxide (1,2-epoxy-3-methyl-butane) was mixed with 16 parts of n-heptane under a nitrogen atmosphere. With the temperature held at 65° C., a solution of the catalyst was added. The catalyst solution was prepared by adding to 0.23 part of triethylaluminum in n-heptane (1.5 molar concentration), an amount of ether equal to 3 moles per mole of aluminum, followed, after cooling to 0° C., by an amount of water equal to 0.5 mole of water per mole of aluminum added over a period of 15 minutes. This solution was stirred for 5 minutes at 0° C., 0.5 mole of acetylacetone was added and the solution was stirred for about 15 minutes at 0° C. and then for about 16 hours at 30° C. The polymerization reaction mixture was then agitated for 19 hours at 65° C. and then was stopped by adding 2 parts of anhydrous ethanol. The polymer was isolated by adding sufficient ether to make the solution of the polymer of low viscosity for ease in handling. The reaction mixture was then washed twice with a 3% aqueous solution of hydrogen chloride, then with water until neutral, then with a 2% aqueous solution of sodium bicarbonate and again with water. The polymer was then precipitated by adding to the reaction mixture 5 volumes of methanol. The insoluble polymer was collected, washed once with methanol and then once with a 0.05% solution of Santonox, i.e. [4,4'-thiobis(6-tert.-butyl-m-cresol)] in methanol, and then dried for 16 hours at 80° C. (0.4 mm. pressure). The polymer so obtained was a tacky rubber which was shown to be moderately crystalline by X-ray diffraction. It had an RSV of 13.0. On analysis it was found to contain 69.69% carbon (theory 69.8%) and 11.67% hydrogen (theory 11.72%). The polymer was insoluble in acetone at 30° C. but was soluble in methyl ethyl ketone at this temperature.

The polymer was further purified by dissolving it in methyl ethyl ketone at 30° C. and then allowing it to crystallize at −30° C. for 16 hours, after which the insoluble polymer was collected, and this procedure was twice repeated. After drying for 16 hours at 80° C. under 0.4 mm. pressure, the polymer was further purified by recrystallizing it 3 times at −30° C. in a similar manner in an equal mixture of methyl ethyl ketone and cyclohexanone at 0.5% concentration. The final product was recovered by adding 4 volumes of methanol and 0.05% Santonox, collecting the insoluble polymer, washing it twice with methanol and drying as before. By this means there was obtained a somewhat opaque, very tough rubber which was shown to have high crystallinity as determined by its X-ray diffraction powder pattern. It had an RSV of 1.8 and a melting point of 39° C. as determined by the birefringence method. After melting, it was slow to recrystallize, requiring standing overnight at room temperature. Infrared analysis indicated it to be a polyether having repeating units containing the isopropyl side chain. On analysis it was found to contain 69.69% carbon and 11.71% hydrogen. A sample of this polymer was oriented by cold drawing (exhibited a typical necking down) to a very strong, rubbery film.

*Example 2*

The process of Example 1 was repeated, except that there was used as the catalyst 0.46 part of triethylaluminum which had been reacted with 0.5 mole of water per mole of aluminum and 1.0 mole of acetylacetonate per mole of aluminum. The polymer, isolated as described above, was obtained in a 54% conversion. It had an RSV of 19.0 and was shown to be crystalline by its X-ray diffraction powder pattern. It was a tacky, snappy rubber.

*Example 3*

Five (5) parts of tertiary butyl ethylene oxide (1,2-epoxy-3,3-dimethyl butane) which was 82.4% pure and containing 0.19% of water was mixed with 14.5 parts of n-heptane under nitrogen. After equilibrating the mixture at 65° C., 0.46 part of triethylaluminum which had been reacted with water and acetylacetone as described in Example 2 was added as a catalyst. After 19 hours at 65° C. a second and equal amount of catalyst was added. The polymerization was run for 67 hours at 65° C., after which it was stopped by adding 2 parts of anhydrous ethanol. The reaction mixture was diluted with ether and washed with hydrogen chloride, water and sodium bicarbonate as described in Example 1. The ether-insoluble polymer was then separated, washed twice with ether and once with a 0.05% solution of Santonox in ether. This ether-insoluble polymer was a white, fibrous material which was shown to be crystalline by its X-ray diffraction powder pattern. It had a melting point of 152° C. as determined by the birefringence method (the initial loss of birefringence occurred at 166° C.).

The ether-soluble polymer, after adding 0.5% of Santonox, was recovered by evaporating off the solvent and drying. On adding excess ether to this fraction, a second crop of ether-insoluble polymer was recovered in the same manner as the first. It was a hard solid which dissolved in tetrachloroethane at 100° C. and recrystallized therefrom on cooling to room temperature. A film was cast from this solution. It was shown to be highly crystalline by its X-ray diffraction powder pattern. It had an RSV of 1.5 as measured on a 0.03% solution in tetrachloroethane.

There was also recovered from the ether solution an ether-soluble polymer which was a tacky rubber having an RSV of 0.19 and, while having the same pattern as the above crystalline polymer, was shown to have only a low degree of crystallinity by its X-ray diffraction powder pattern.

*Example 4*

Two (2) parts of a tertiary butyl ethylene oxide 86% pure and containing 0.007% of water was mixed with 4.7 parts of n-heptane under nitrogen. With the temperature held at 65° C. there was then added 0.18 part of triethylaluminum which had been reacted with 0.5 mole of water and 0.5 mole of acetylacetone per mole of triethylaluminum and 12.5 moles of ether per mole of triethylaluminum as described in Example 1. After 19 hours an equal portion of the catalyst was added and the polymerization was allowed to run at 65° C. for a total of 49.5 hours, after which it was stopped by adding 0.8 part of anhydrous ethanol. The polymer was isolated as described in Example 3 whereby there was obtained a white, fibrous, ether-insoluble polymer. It was shown to have a high degree of crystallinity as shown by its X-ray diffraction powder pattern and had a melting point of 132° C. as shown by the birefringence method, the initial loss of birefringence occurring at 157° C. A film of this polymer was molded at about 150° C. and examined by infrared. The infrared spectra showed that the polymer was in accord with a polyether having a tertiary butyl side chain.

Again an ether-soluble polymer was obtained which was a very tacky, snappy rubber having an RSV of 0.22 as measured on a 0.1% solution in chloroform at 25° C.

*Example 5*

In this example a tertiary butyl ethylene oxide was used which was 99.7% pure. 0.5 part of this epoxide was mixed with 3.0 part of n-heptane under nitrogen. With the temperature held at 65° C. there was added 0.046 part of triethylaluminum which had been reacted with 0.5 mole of water and 0.5 mole of acetylacetone as described in Example 4. After 19 hours and again after 43 hours, an equal amount of the catalyst was added. At the end of 72 hours of polymerization the polymerization was stopped by adding 0.2 part of anhydrous ethanol. The ether-insoluble polymer was isolated as described in Example 3. It was found to be crystalline by X-ray diffraction powder pattern. It had the same X-ray pattern as did the polymers produced in Examples 2 and 3, thus demonstrating that, as determined by infrared analysis in Example 4, the product was crystalline poly(tert.-butyl ethylene oxide).

*Example 6*

Twenty (20) parts of neopentyl ethylene oxide which was 99.5% pure and contained 0.25% water was mixed with 46.4 parts of n-heptane under nitrogen. With the temperature at 65° C., there was added 1.82 parts of triethylaluminum which had been reacted with 0.5 mole of water and 0.5 mole of acetylacetone as described in Example 4. After 18 hours at 65° C., 8 parts of anhydrous ethanol was added. The polymer was isolated by adding sufficient ether to make the solution of the polymer of low viscosity for ease in handling. The reaction mixture was then washed twice with a 3% aqueous solution of hydrogen chloride, with water until neutral, then with a 2% aqueous solution of sodium bicarbonate and again with water. The polymer was stabilized by adding 0.5% of Santonox and then the solvent was removed and the polymer was dried for 16 hours at 80° C. under vacuum. The polymer so isolated amounted to a conversion of 99%. It was a tough, tacky rubber having an RSV of 15.7 as measured on a 0.1% solution in chloroform at 25° C.

One part of this polymer was purified by dissolving in 100 ml. of a 50:50 (by volume) mixture of methyl ethyl ketone and cyclohexanone, by heating at 50° C. under nitrogen and the allowing the polymer to crystallize at −30° C. for 16 hours. The crystals were collected, washed twice with the same solvent mixture, twice with methanol and once with methanol containing 0.05% Santonox. It was a white crystalline solid. However, after drying for 16 hours at 80° C., it was a tacky rubber. Apparently it had a melting point near 80° C. and did not readily recrystallize since it did not recrystallize on standing at room temperature for 3 days. It was again crystallized by redissolving in the 50:50 methyl ethyl ketone:cyclohexanone solvent, and crystallizing first at 3° C. and then at −30° C. The polymer was recovered as described above except that it was not washed with the mixed solvent and was dried first at room temperature and then at 50° C. under vacuum. It was a white crystalline solid having an RSV of 1.7 as measured in chloroform at 25° C. On analysis it was found to contain 73.6% carbon and 12.39% hydrogen (theory 73.7% and 12.37%, respectively). It was shown to be highly crystalline by X-ray diffraction and had a melting point of 75° C. by differential thermal analysis. It did not recrystallize on cooling from the melt.

A second crystalline fraction was recovered from the second methyl ethyl ketone:cyclohexanone wash in the initial isolation of the polymer and crystallizing it at −30° C. The insoluble polymer was collected, redissolved in the mixed solvent at room temperature and recrystallized at −30° C. This was repeated twice after which the polymer was washed twice with methanol, once with methanol containing 0.05% Santonox and then was dried, first for 16 hours at room temperature and then 16 hours at 50° C. under vacuum. The white solid so obtained had an RSV of 2.0 as measured in chloroform at 25° C. and was shown to be highly crystalline by X-ray diffraction. It had a melting point of 82° C. by differential thermal analysis (melting range of 57–87° C.) and did not recrystallize from the melt on cooling.

What I claim and desire to protect by Letters Patent is:

1. A crystalline linear homopolymer of an epoxide selected from the group consisting of 1,2-epoxy-3-methylbutane, 1,2-epoxy-3,3-dimethylbutane, and 1,2-epoxy-4,4-dimethylpentane, said polymers being characterized by exhibiting a crystalline-type X-ray diffraction powder pattern and having a melting point between about 38° C. and about 166° C.

2. A crystalline linear homopolymer of 1,2-epoxy-3-methylbutane, said homopolymer exhibiting a crystalline-type X-ray diffraction powder pattern and having a melting point of about 38–39° C.

3. A crystalline linear homopolymer of 1,2-epoxy-3,3-dimethylbutane, said homopolymer exhibiting a crystalline-type X-ray diffraction powder pattern and having a melting point of from about 132° to about 166° C.

4. A crystalline linear homopolymer of 1,2-epoxy-4,4-dimethylpentane, said homopolymer exhibiting a crystalline-type X-ray diffraction powder pattern and having a melting point of about 75° C. to about 82° C.

References Cited by the Examiner
UNITED STATES PATENTS

| 2,723,294 | 11/1955 | Benoit | 260—348 |
| 2,969,402 | 1/1961 | Hill et al. | 260—2 |
| 2,971,988 | 2/1961 | Hill et al. | 260—2 |

FOREIGN PATENTS

| 799,955 | 8/1958 | Great Britain. |

OTHER REFERENCES

Chemical Abstracts, 47, 12,215(b) (1953).
Tanford, "Physical Chemistry of Macromolecules," Wiley, 1961, New York, pp. 37 and 38 (QD 471 T3).
Ishida, "Chemical Society of Japan Bulletin," vol. 33, No. 7, July 1960, pages 924–930 (QD1 C65).
Pacquin, "Epoxydverbindungen and Epoxyhardze," Springer Verlag, 1958, Berlin, pages 2 and 4 relied on (TP 986 E6 P3).

WILLIAM H. SHORT, *Primary Examiner.*

S. N. RICE, T. PERTILLA, *Assistant Examiners.*